June 30, 1970 H. J. TYLER ET AL 3,518,601

CONTROL DEVICE HAVING AN IMPROVED ONE-PIECE MOUNTING BRACKET

Original Filed Oct. 12, 1964 4 Sheets-Sheet 1

INVENTORS
HUGH J. TYLER
DENIS G. WOLFE

BY Candor & Candor

THEIR ATTORNEYS

CONTROL DEVICE HAVING AN IMPROVED ONE-PIECE MOUNTING BRACKET

Original Filed Oct. 12, 1964 4 Sheets-Sheet 2

INVENTORS
HUGH J. TYLER
DENIS G. WOLFE

BY Candor & Candor

THEIR ATTORNEYS

CONTROL DEVICE HAVING AN IMPROVED ONE-PIECE MOUNTING BRACKET

Original Filed Oct. 12, 1964 4 Sheets-Sheet 3

INVENTORS
HUGH J. TYLER
DENIS G. WOLFE

BY
Candor & Candor
THEIR ATTORNEYS

INVENTORS
HUGH J. TYLER
DENIS G. WOLFE
BY
Candor & Candor
THEIR ATTORNEYS

United States Patent Office 3,518,601

Patented June 30, 1970

3,518,601
CONTROL DEVICE HAVING AN IMPROVED ONE-PIECE MOUNTING BRACKET

Hugh J. Tyler, Santa Ana, Calif., and Dennis H. Wolfe, Youngwood, Pa., assignors to Robertshaw Controls Company, Richmond, Va., a corporation of Delaware Application Feb. 9, 1967, Ser. No. 614,996, now Patent No. 3,410,972, dated Nov. 12, 1968, which is a division of application Ser. No. 403,039, Oct. 12, 1964, now Patent No. 3,316,375, dated Apr. 25, 1967. Divided and this application Aug. 14, 1968, Ser. No. 752,619
Int. Cl. H01h *37/36;* G01k *1/22*
U.S. Cl. 337—327 6 Claims

ABSTRACT OF THE DISCLOSURE

A thermostatically operated electrical switch construction wherein a movable contact is carried by an L-shaped flexible member and is moved toward a stationary contact by an expansible and contractible power element, the contacts being electrically interconnected to terminal means having tension loops therein to positively maintain the contact interconnecting portions in fixed position relative to the housing of the switch construction. The switch construction includes unique bracket means for mounting the power element and capillary tube of the temperature sensing bulb to the housing of the switch construction.

This application is a divisional patent application of its copending patent application, Ser. No. 614,996, filed Feb. 9, 1967, now Pat. No. 3,410,972, issued Nov. 12, 1968, which, in turn, is a divisional patent application of its copending parent application, Ser. No. 403,039, filed Oct. 12, 1964, now U.S. Pat. No. 3,316,375, issued Apr. 25, 1967 and assigned to the same assignee to whom this divisional is assigned.

This invention relates to an improved control device or the like as well as to improved parts for such a control device or the like.

In particular, this invention relates to a control device or the like wherein operating means is carried by a housing means and is moved between its operating positions by a condition responsive means carried by the housing means and sensing different conditions.

Certain of the features of this invention are to pro vide improved parts for such a control device or the like.

Accordingly, it is an object of this invention to provide an improved control device or the like having one or more of the novel features set forth above or hereinafter shown or described.

Another object of this invention is to provide improved parts for such a control device or the like.

Other objects, uses and advantages of this invention are apparent from a reading of this description which proceeds with reference to the accompanying drawings forming a part thereof and wherein.

Figure 1:
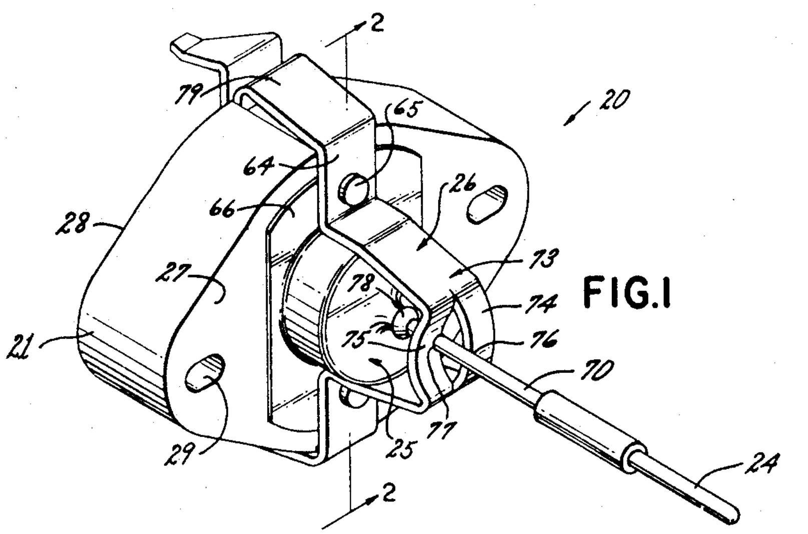
FIG. 1 is a perspective view of one embodiment of the control device of this invention.

While the various features of this invention are hereinafter described and illustrated as being particularly adaptable for an electrical switching means, it is to be understood that the various features of this invention can be utilized singly or in any combination thereof to provide other types of control devices or the like.

Therefore, this invention is not to be limited to only the embodiments illustrated in the drawings because the drawings are merely utilized to illustrate one of the wide variety of uses of this invention.

Referring now to FIGS. 1–4, the improved control device of this invention is generally indicated by the reference numeral 20 and comprises a housing means 21 carrying a pair of terminals 22 and 23 adapted to be electrically interconnected together in a manner hereinafter described upon a temperature sensing bulb 24 of a condition responsive means 25 sensing a predetermined temperature, the condition responsive means 25 being secured to the housing means 21 by a mounting bracket 26 of this invention in a manner hereinafter described.

While the housing means 21 can have any suitable shape and be formed of any suitable material, the embodiment thereof illustrated in the drawing is formed from ceramic material having opposed flat surfaces 27 and 28 interrupted by mounting bolt holes 29.

The housing means 21 has a cavity 30 provided therein and interconnected to the side 28 thereof by slots 31 and 32 which respectively receive the terminals 22 and 23.

Figures 7, 8, 9, 10:
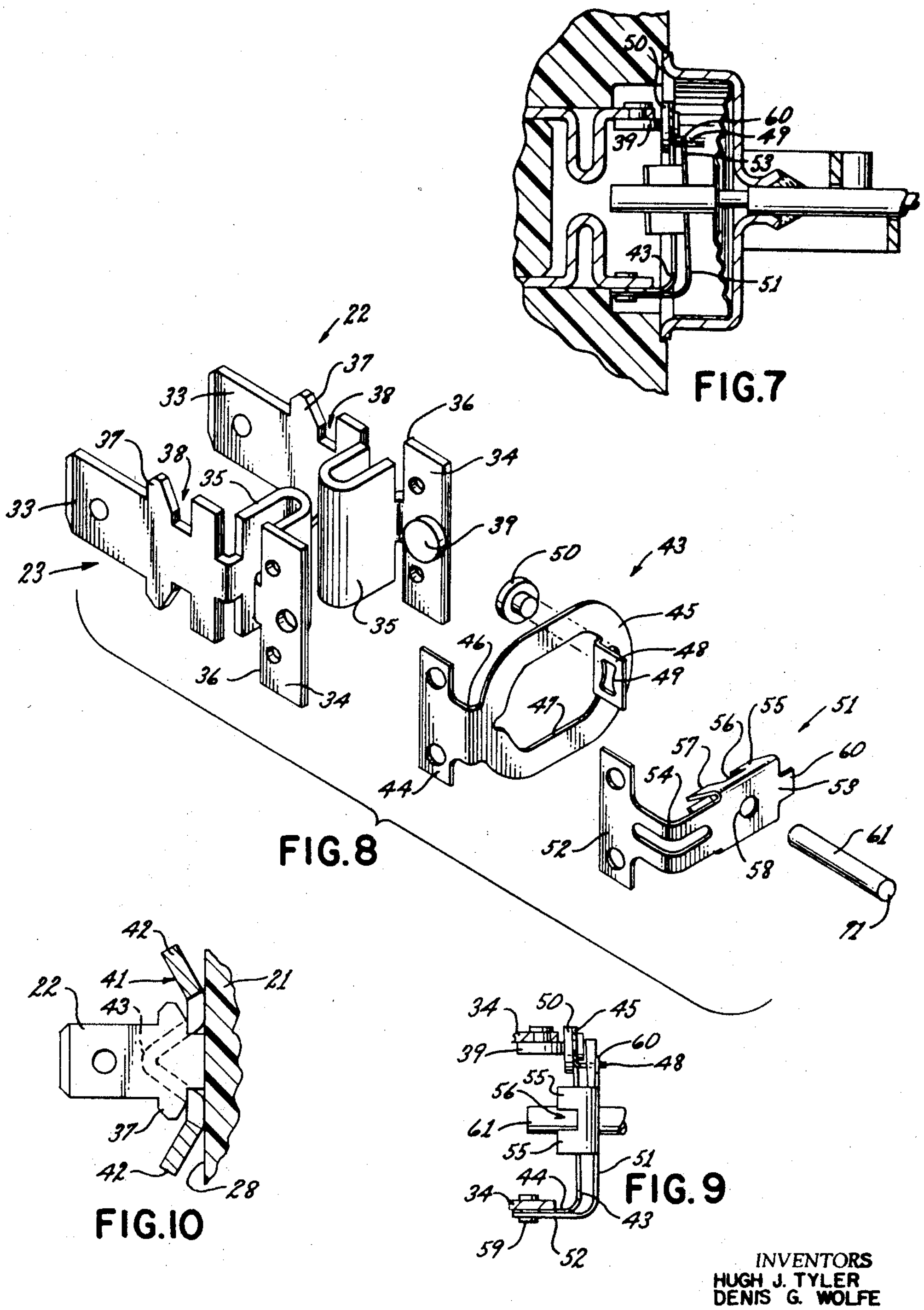
FIG. 7 is a view similar to FIG. 6 and illustrates the control device in its overshooting position.
FIG. 8 is an exploded perspective view of certain of the operating parts of the control device of FIG. 1.
FIG. 9 is a fragmentary side view of the operating levers of the control device of FIG. 1.
FIG. 10 is a fragmentary view similar to FIG. 2 and illustrates the terminal locking means before the same has been moved to its locking position.

As illustrated in FIG. 8, each terminal 22 and 23 has a pair of opposed ends 33 and 34 and is provided with a tension loop 35 intermediate the ends 33 and 34 for a purpose hereinafter described. The end 34 of each terminal 22 and 23 has a housing engaging surface 36 while the end 33 thereof has outwardly directed tangs 37 cooperating therewith to define recesses 38 for a purpose hereinafter described.

The end 34 of the terminal 22 has an electrical contact 39 fixed thereto in any suitable manner.

Figures 2, 3:
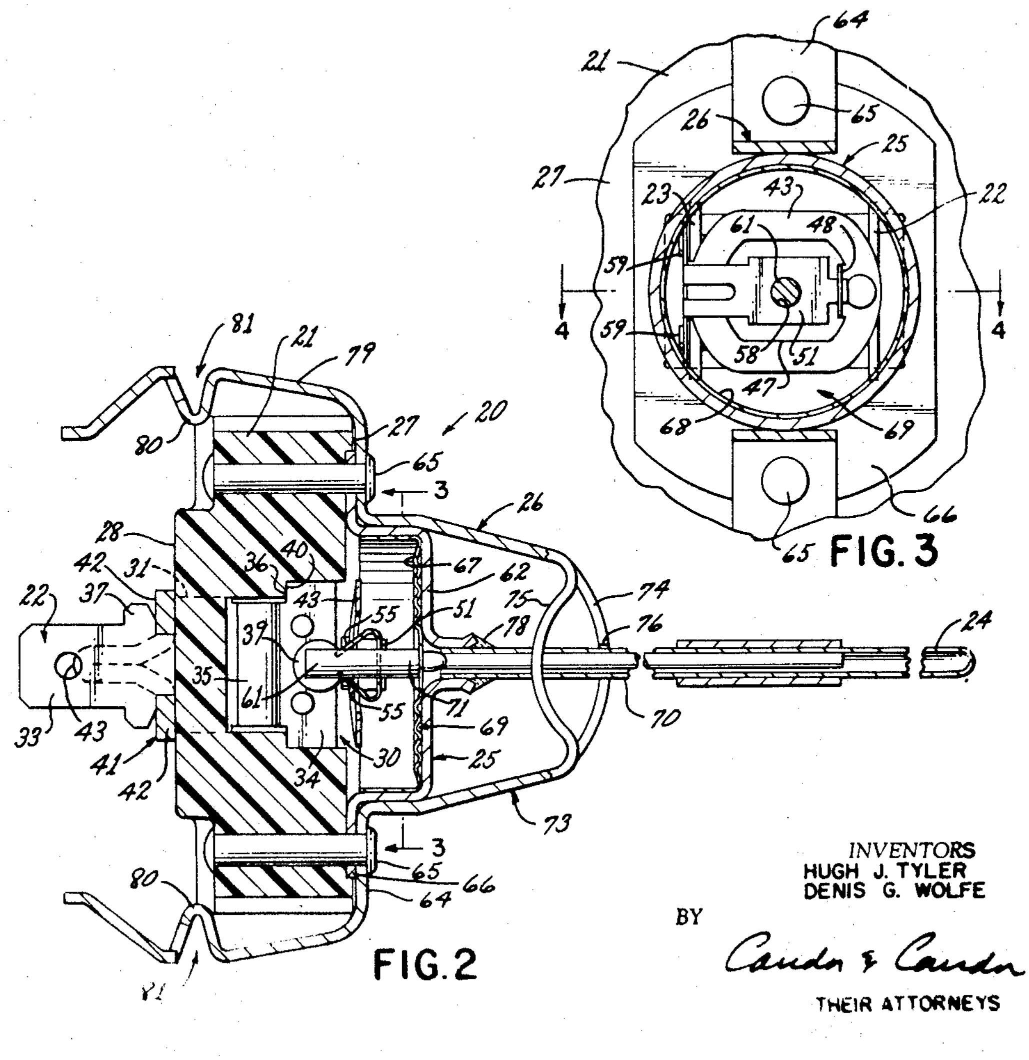
FIG. 2 is an enlarged, cross-sectional view taken substantially on line 2—2 of FIG. 1.
FIG. 3 is a fragmentary, cross-sectional view taken on line 3—3 of FIG. 2.

In order to interconnect the terminals 22 and 23 to the housing means 21, the surfaces 36 of the ends 34 of the terminals 22 and 23 are respectively disposed against shoulder means 40, FIG. 2, of the housing 21 to positively locate the ends 34 of the terminals 22 and 23 relative to the housing means 21.

In this manner, the ends 33 of the terminals 22 and 23 project outwardly through the slots 31 and 32 in the housing means 21 in such a manner that the flanges 37 thereof are disposed spaced from the surface 28 of the housing means 21.

A pair of locking members 41 having the original configuration illustrated in FIG. 10 are utilized to not only place the terminals 22 and 23 under tension between the ends 34 and 33 thereof, but also to positively lock the terminals 22 and 23 to the housing means 21, the locking means 41 each having a pair of flat portions 42 interconnected together by loop portions 43 thereof.

When each locking member 41 is deformed from the position illustrated in FIG. 10 to the position illustrated in FIG. 2, it can be seen that the flat portions 42 thereof are wedged inwardly between the flanges 37 of the respective terminal 22 or 23 and the surface 28 of the housing means 21 to place the terminal 22 or 23 under tension between the shoulders 40 and the surface 28 so as to positively hold the surfaces 36 of the terminals 22 and 23 against the shoulders 40, the tension loop 35 of the respective terminal 22 or 23 permitting the same to be readily placed under tension whereby the locking member holds the surface 36 of the respective terminal 22 or 23 against the shoulders 40 of the housing means 21 with a force of approximately 30 to 50 pounds.

Thus, it can be seen that once the terminals 22 and 23 have been locked to the housing means 21 in the above manner, the ends 34 thereof are maintained in fixed position relative to the housing means 21 so that subsequent manipulation or deformation of ends 33 of terminals 22 and 23 will not affect the maintenance of the fixed position of ends 34 of the terminals 22 and 23 relative to the housing means 21; thus, subsequent calibration of the control device 20 will remain stable.

As illustrated in FIG. 8, a first flexible member 43 is provided and has a pair of opposed ends 44 and 45 disposed at right angles relative to each other by a bent portion 46 thereof. The end 45 of the flexible member 43 has an opening 47 provided therethrough and from which is carved an outwardly directed tang 48 having a slot 49 passing therethrough. The end 45 of the flexible member 43 carries a movable contact 50 in any suitable manner.

As illustrated in FIG. 8, a second flexible member 51 is provided and has opposed ends 52 and 53 disposed at right angles relative to each other by a bent portion 54 of the member 51. The end 53 of the flexible member 51 has a pair of angled finger-like portions 55 respectively provided with recesses 56 at the free ends 57 thereof for a purpose hereinafter described. A substantially circular opening 58 passes through the end 53 of the flexible member 51 and is substantially aligned with the fingers 55 thereof for a purpose hereinafter described.

Figures 4, 5, 6:
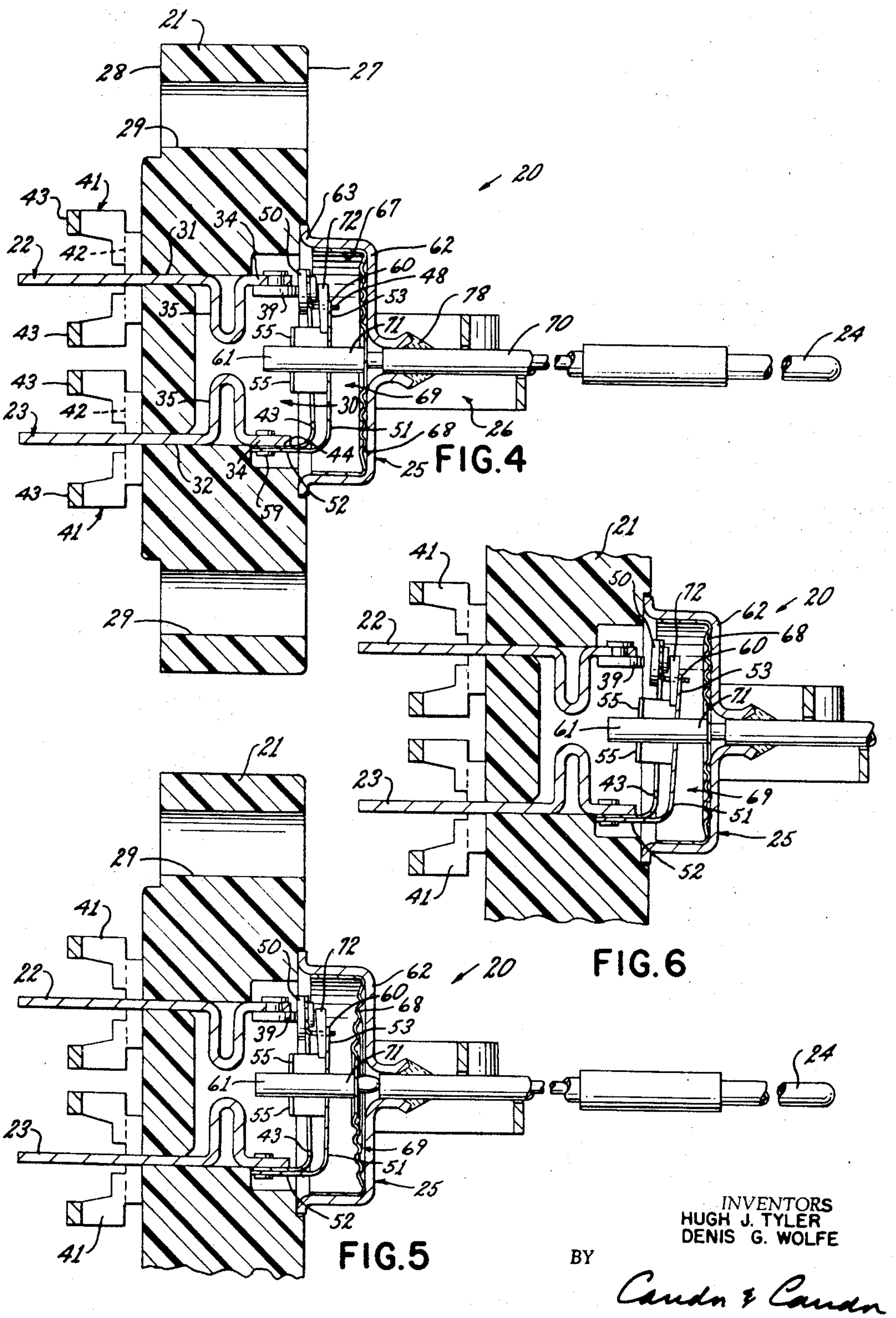
FIG. 4 is a cross-sectional view taken substantially on line 4—4 of FIG. 3.
FIG. 5 is a view similar to FIG. 4 and illustrates the control device in another operating position thereof.
FIG. 6 is a fragmentary view similar to FIG. 4 and illustrates the control device in still another operating position thereof.

The ends 44 and 52 of the flexible members 43 and 51 are adapted to be respectively interconnected to the end 34 of the terminal 23 in stacked relation by a common fastening means 59 in the manner illustrated in FIG. 4 whereby an outwardly directed tang 60 on the end 53 of the flexible member 51 is received in the overshoot slot 49 of the tang 48 of the flexible member 43.

A substantially cylindrical rod-like member or motion transmitting means 61 is adapted to project loosely through the opening 58 in the flexible member 51 and be slidingly received between the flexible fingers 55 of the flexible member 51 which project through the opening 47 in the flexible member 43, the resiliency of the fingers 55 tending to frictionally hold the rod-like member 61 in a fixed sliding relationship therewith as the rod-like member 61 is received in the slots 56 of the fingers 55 in the manner illustrated in FIG. 9.

The condition responsive means 25 includes a cup-shaped member 62 adapted to have the open end 63 thereof held against the surface 27 of the housing means 21 by the mounting bracket 26 having portions 64 fastened to the housing means 21 by fastening means 65 respectively passing through the portion 64 of the mounting bracket 26 and a peripheral flange 66 at the open end 63 of the member 62.

Another cup-shaped member 67 is secured in the cup-shaped member 62 and has a fluted wall 68 cooperating therewith to define a chamber 69 interconnected to the temperature sensing bulb 24 by the conduit means 70.

The movable wall 68 of the condition responsive means 25 is engageable with an end 71 of the rod-like member 61.

When it is desired to assemble and calibrate the device 20 of this invention, an insert 72 formed of a material that can be subsequently vaporized is disposed in the slot 49 of the flexible member 43 in the manner illustrated in FIG. 4 to prevent the end 53 of the flexible member 51 from moving relative to the flexible member 43.

In addition, an unset epoxy resin, or similar material, is disposed on the end 53 of the flexible member 51 in the area of hole 58 and the rod-like member 61 to be later set by heat in a manner hereinafter described.

Thereafter, the condition responsive means 25 is assembled to the housing means 21 by the mounting bracket 20 whereby the flange 66 of the condition responsive means 25 is firmly held against the surface 27 of the housing means 21. With the temperature sensing bulb 24 of the condition responsive means 25 sensing a temperature lower than the desired temperature for closing the contacts 50 and 39, the end 71 of the rod-like member 61 is disposed against the wall 68 of the condition responsive means 25 and holds the contacts 50 and 39 together.

The temperature sensing bulb 24 is subsequently immersed in a fluid bath having a controlled temperature, which is dependent upon the temperature that the device 20 is to sense to close the contacts 50 and 39, whereby the movable wall 68 of the condition responsive means 25 moves to the left as the fluid expands in the bulb 24 until the movement of the wall 68 is terminated whereby the rod-like member 61 will be moved relative to the fingers 55 in the manner illustrated in FIG. 5.

Subsequently, the control device 20 is heated to approximately 500° F. whereby the insert 72 completely vaporizes and the epoxy resin on the rod-like member 61 and end 53 of flexible member 51 in the area of hole 58 is set to permanently attach the rod-like member 61 and the fingers 55 in the position illustrated in FIG. 5.

Thus, when the temperature sensing bulb 24 senses a temperature below the above predetermined temperature, the fluid in the chamber 69 of the condition responsive means 25 contracts whereby the wall 68 moves from the position illustrated in FIG. 5 toward the casing 62 to permit the natural resiliency of the flexible members 43 and 51 to move to the right therewith and move the contact 50 out of electrical contact with the contact 39 in the manner illustrated in FIG. 6.

However, should the temperature sensing bulb 24 sense an increase in temperature, the expanding fluid in the chamber 69 moves the wall 68 back to the left whereby the same moves the rod-like member 61 to the left to cause the flexible member 51 to flex relative to the end 52 thereof and cause simultaneous flexing of the member 43 so that the contact 50 is moved toward the contact 39, the contact 50 being moved against the contact 39 when the temperature sensing bulb 24 senses the predetermined temperature. Such flexing movement of the flexible member 43 is because the member 43 is biased against flexible member 51, and, since member 51 is heavier than member 43, flexing movement of member 51 controls the flexing movement of member 43.

However, should the temperature sensed by the temperature sensing bulb 24 exceed the predetermined temperature, it can be seen that the end 53 of the flexible member 51 is adapted to move further to the left relative to the flexible member 43 when the flexible member 43 has the contact 50 thereof engaging the contact 39 because the tang 60 of the flexible member 51 can move in the overshoot slot 49 in the manner illustrated in FIG. 7 to prevent the increased temperature from adversely affecting the flexible member 43.

While the insert 72 can comprise any suitable material having the above-mentioned properties, one embodiment thereof is a copolymer acetal resin sold under the trademark Celcon by the Celanese Corporation of America of New York, N.Y.

Therefore, it can be seen that the control device 20 of this invention is adapted to be readily calibrated in one simple operation without requiring calibration of individual parts thereof before the same are assembled together.

The mounting bracket 26 has a bifurcated portion 73 defining a pair of split sections 74 and 75 respectively having arcuate cross-sectional configurations whereby the concave faces thereof of the sections 74 and 75 face each other and are respectively provided with recesses 76 and 77 which receive the conduit 70 of the condition responsive means 25 and supports the same at a point spaced from its interconnection 79 with the casing 62 to prevent bending at the weld point 78 which is readily subject to failure.

The mounting bracket 26 has a pair of rearwardly extending arms 79 provided with looped portions 80 which permit the arms 79 to be snap-fitted in a recess of a supporting structure so that the edge of the recess can be received in the notches 81 thereof whereby the control device 20 of this invention is readily adapted to be snap-fitted to a supporting structure by the arms 79 thereof as well as be fastened thereto by the mounting holds 29 previously described.

Figure 11:
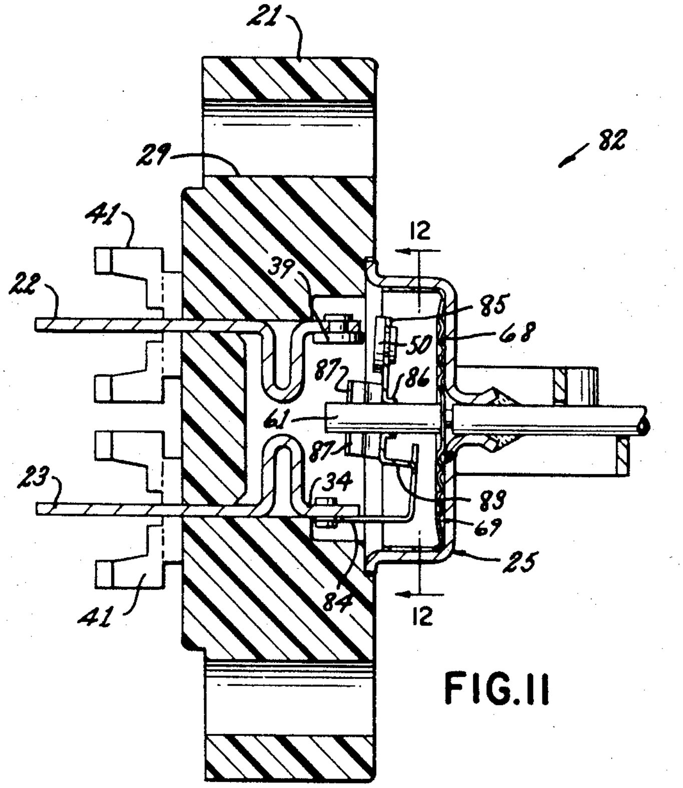
FIG. 11 is a view similar to FIG. 4 and illustrates another embodiment of this invention.
Figure 12:
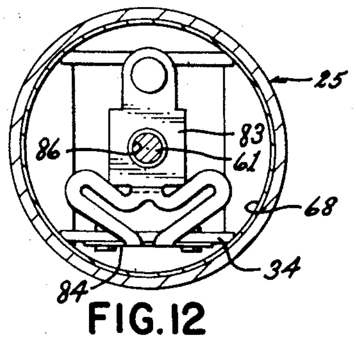
FIG. 12 is a fragmentary, cross-sectional view taken substantially on line 12—12 of FIG. 11.

While the control device 20 of this invention has been previously described as having two flexible members 51 and 43, it is to be understood that the same could be modified in the manner illustrated in FIGS. 11 and 12 wherein another control device of this invention is generally indicated by the reference numeral 82 and parts thereof similar to the control device 20 are indicated by like reference numerals.

However, instead of the flexible members 43 and 51 of the control device 20, the control device 82 of this invention has a single flexible member 83 having one end 84 thereof interconnected to the end 34 of the terminal 23 and has the other end 85 thereof carrying the movable contact 50. The flexible member 83 has an opening 86 passing through the end 85 thereof and aligned with a plurality of flexible fingers 87 adapted to slidingly receive the rod 61 in the manner previously described.

Thus, it can be seen that when the wall 68 of the condition responsive means 25 of the control device 82 moves to the left, the same moves the rod 61 therewith to flex the flexible member 83 to the left to place the contact 50 into electrical contact with the contact 39 when the condition responsive means 25 senses a predetermined temperature, the control device 82 being substantially calibrated in the same manner as the control device 20 except that no overshoot means are provided therein whereby the insert 72 is eliminated.

Accordingly, it can be seen that not only does this invention provide improved control devices or the like, but also this invention provides improved parts for such control devices or the like.

While the form of the invention now preferred has been disclosed as required by the statutes, other forms may be used, all coming within the scope of the claims which follow.

What is claimed is:

1. A control device comprising a housing means, a condition responsive means, and a one-piece mounting bracket, said mounting bracket having a first part abutting and securing said condition responsive means to said housing means and having a second part for securing said device to a supporting structure, said mounting bracket having a third part spanning said condition responsive means in spaced relation thereto to protect said condition responsive means, said first part of said mounting bracket being integrally and respectively interconnected to said second and third parts at opposed ends of said first part.

2. A control device as set forth in claim 1, wherein said second part of said mounting bracket has a spring finger to snap-fit said mounting bracket in an opening of said supporting structure.

3. A control device as set forth in claim 1, wherein said condition responsive means has a conduit means connected thereto, said third part of said mounting bracket engaging said conduit means to support said conduit means at a point spaced from said condition responsive device.

4. A control device as set forth in claim 3, wherein said third part of said mounting bracket has a slot formed therein and receiving said conduit means therethrough.

5. A control device as set forth in claim 3 wherein said third part of said mounting bracket is bifurcated to define two split sections disposed in stepped side-by-side relation relative to each other and respectively engaging said conduit means where said conduit means passes therebetween, each section being arcuate and having the concave side thereof facing the concave side of the other section.

6. In a control device or the like as set forth in claim 5, each section having a recess therein at a side edge thereof receiving said conduit means as said condition responsive means to position said conduit means, said conduit means meing disposed substantially perpendicular to said concave sides of said sections.

References Cited

UNITED STATES PATENTS

| | | | |
|---|---|---|---|
| 1,952,279 | 3/1934 | Peterson | 337—262 X |
| 2,911,575 | 11/1959 | Roberts | 339—128 X |
| 3,213,189 | 10/1965 | Mitchell et al. | 339—128 X |
| 3,274,362 | 9/1966 | Frendock | 337—327 X |

H. B. GILSON, Primary Eaminer

U.S. Cl. X.R.

339—128